United States Patent [19]

Hsu

[11] Patent Number: 5,552,808
[45] Date of Patent: Sep. 3, 1996

[54] POINT-AND-DRAW DEVICE COORDINATIVELY DRIVEN BY TWO GEAR SYSTEMS

[76] Inventor: Caven Hsu, c/o Hung Hsing Patent Service Center, P.O. Box 55-1670, Taipei, Taiwan

[21] Appl. No.: 401,185

[22] Filed: Mar. 9, 1995

[51] Int. Cl.$^6$ ........................................... G09G 5/08
[52] U.S. Cl. ..................... 345/157; 345/160; 345/184
[58] Field of Search ........................ 345/184, 156, 345/157, 158, 160, 161, 163, 166, 168; 74/471 XY, 89.13; 273/148 B, 148 R, 438

[56] References Cited

U.S. PATENT DOCUMENTS

| 5,012,230 | 4/1991 | Yasuda | 345/184 |
| 5,086,296 | 2/1992 | Clark | 345/157 |

OTHER PUBLICATIONS

Neufeldt "Webster's New World Dictionary" 3rd College Edition.

*Primary Examiner*—Richard Hjerpe
*Assistant Examiner*—Regina Liang

[57] ABSTRACT

A point-and-draw device of a computer includes: a X-axis and Y-axis driving gear system respectively mounted in a housing and generally orienting perpendicularly with each other, and a driving plate for driving the two gear systems slidably held in the housing having an actuating portion protruding upwardly from the driving plate through a top window formed in an upper cover of the housing, whereby upon coordinative moving of the driving plate to move the X-axis or Y-axis driving gear system, a movement pulse signal can be electronically sensed for encoding the pulse signals into the computer to be decoded and read for moving a cursor on a CRT screen of the computer corresponding to the movement of the driving plate in the housing for an effective, reliable and ergonomic manipulation of the point-and-draw device.

4 Claims, 5 Drawing Sheets

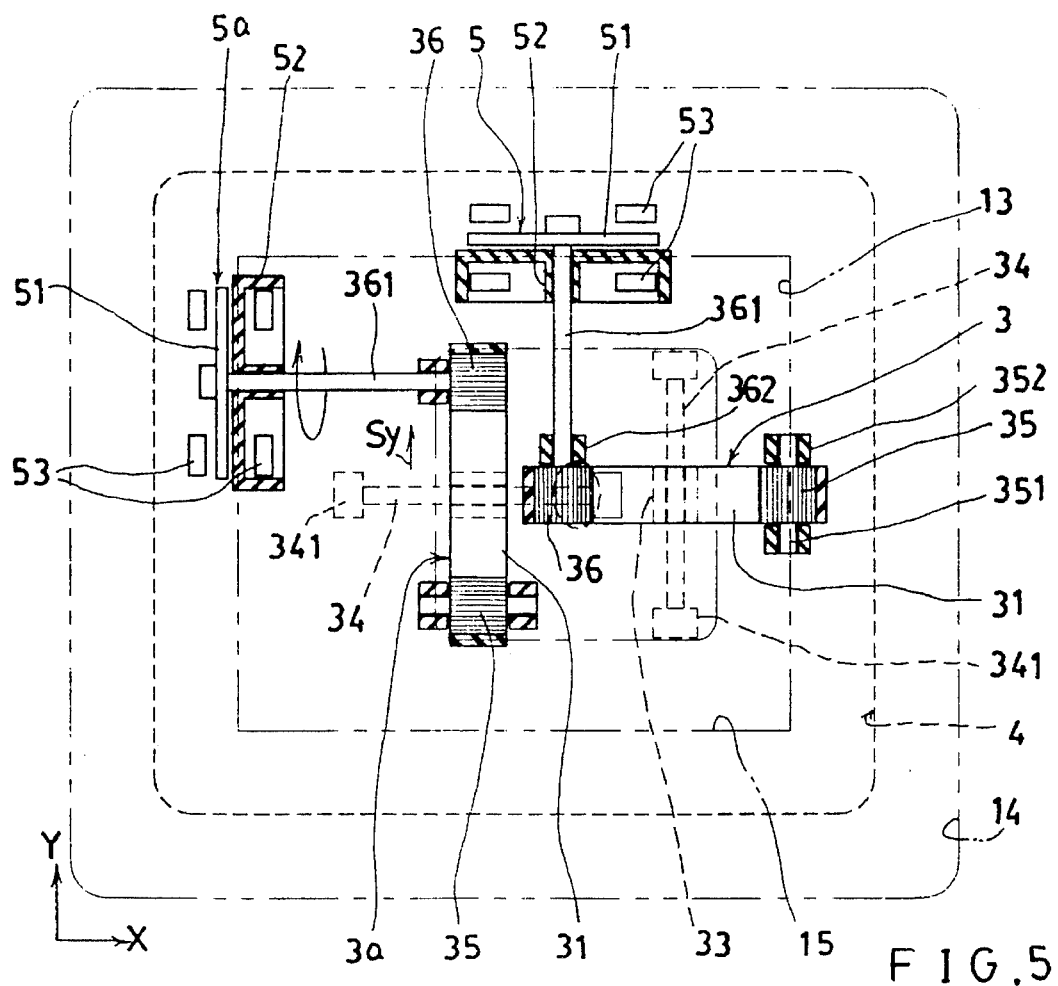
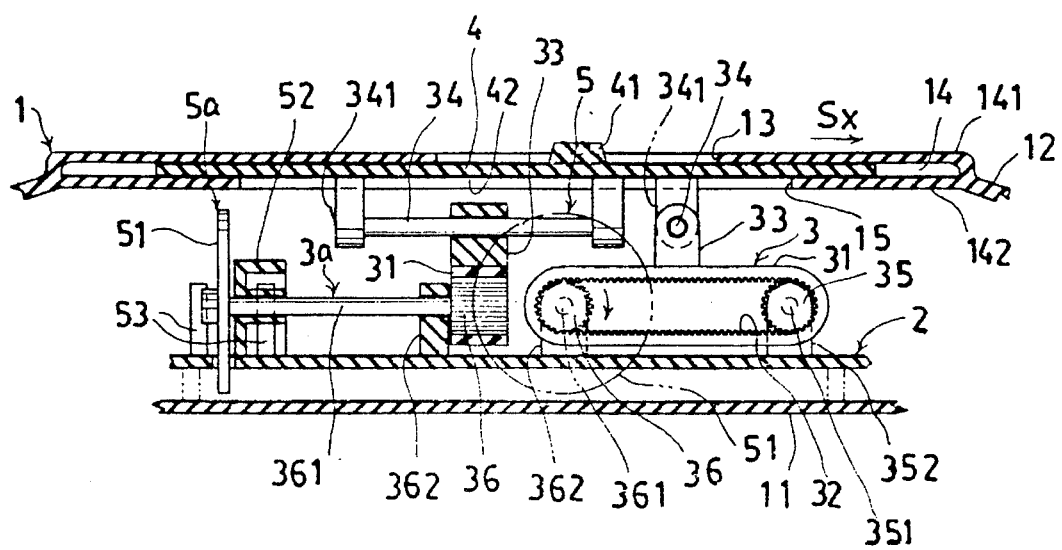
FIG. 5
FIG. 6

POINT-AND-DRAW DEVICE COORDINATIVELY DRIVEN BY TWO GEAR SYSTEMS

BACKGROUND OF THE INVENTION

A conventional mouse as shown in FIGS. 1 and 2 includes: a ball B rotatably mounted in a mouse box P and protruding downwardly to be rolled on a flat surface from a bottom hole H formed in a bottom portion of the box having an electronic circuit provided in the box, a X-axis encoder E and a Y-axis encoder E' respectively driven by two rollers R1, R2 rotatably contacted with a spherical surface of the ball B, a pressure roller R pressurizing the ball B for ensuring a better contact between the rollers R1, R2 and the ball B, and two detectors D, D' respectively detecting the pulse signals from the two encoders E, E' for electronically sensing the movement pulse signals when moving the mouse either on X or Y axis when rolling the ball B, as processed by the electronic circuit in the mouse box P for producing and transmitting pulse waves to a computer to be decoded and read for moving a cursor on a CRT screen corresponding to the movement of the mouse.

However, such a conventional mouse may have the following drawbacks:

1. For ensuring a well contact between the rollers R1, R2 and the ball B, the spherical surface of the ball such as made of rubber should be frictional to thereby be easily adhered with dusts or dirts when rolled on the flat surface, possibly influencing a smooth rolling operation of the mouse.

2. During a coordinative rolling of the mouse on a flat mat kept on a desk, the mouse may be accidentally moved beyond the scope or area of the flat mat. A returning movement or relocation of the mouse on the mat will interrupt a computer operation, causing inconvenience for the computer operator.

3. The ball B should be touched on a flat surface for its rolling so that the mouse should always be placed on a flat surface, thereby requiring a space for placing the mat and mouse, and also limiting the maneuverability for handling the mouse. For example, the mouse can not be held on an operator's hand by suspending the mouse above a table surface.

4. The computer operator should always by very scrupulous in order to prevent an "escape" of the mouse from the flat mat, thereby reducing the keying efficiency or decreasing the data entry speed to the computer.

The present inventor has found the drawbacks of the conventional mouse, and invented the point-and-draw device of the invention.

SUMMARY OF THE INVENTION

The object of the present invention is to provide a point-and-draw device of a computer including: a X-axis and Y-axis driving gear system respectively mounted in a housing and generally orienting perpendicularly with each other, and a driving plate for driving the two gear systems slidably held in the housing having an actuating portion protruding upwardly from the driving plate through a top window formed in an upper cover of the housing, whereby upon coordinative moving of the driving plate to move the X-axis or Y-axis driving gear system, a movement pulse signal can be electronically sensed for encoding the pulse signals into the computer for moving a cursor on a CRT screen of the computer corresponding to the movement of the driving plate in the housing for an effective, reliable and ergonomic manipulation of the point-and-draw device.

BRIEF DESCRIPTION OF THE DRAWINGS

FIG. 5 is a top-view illustration of the present invention.

FIG. 6 is a sectional drawing of the present invention.

DETAILED DESCRIPTION

Figure 1:
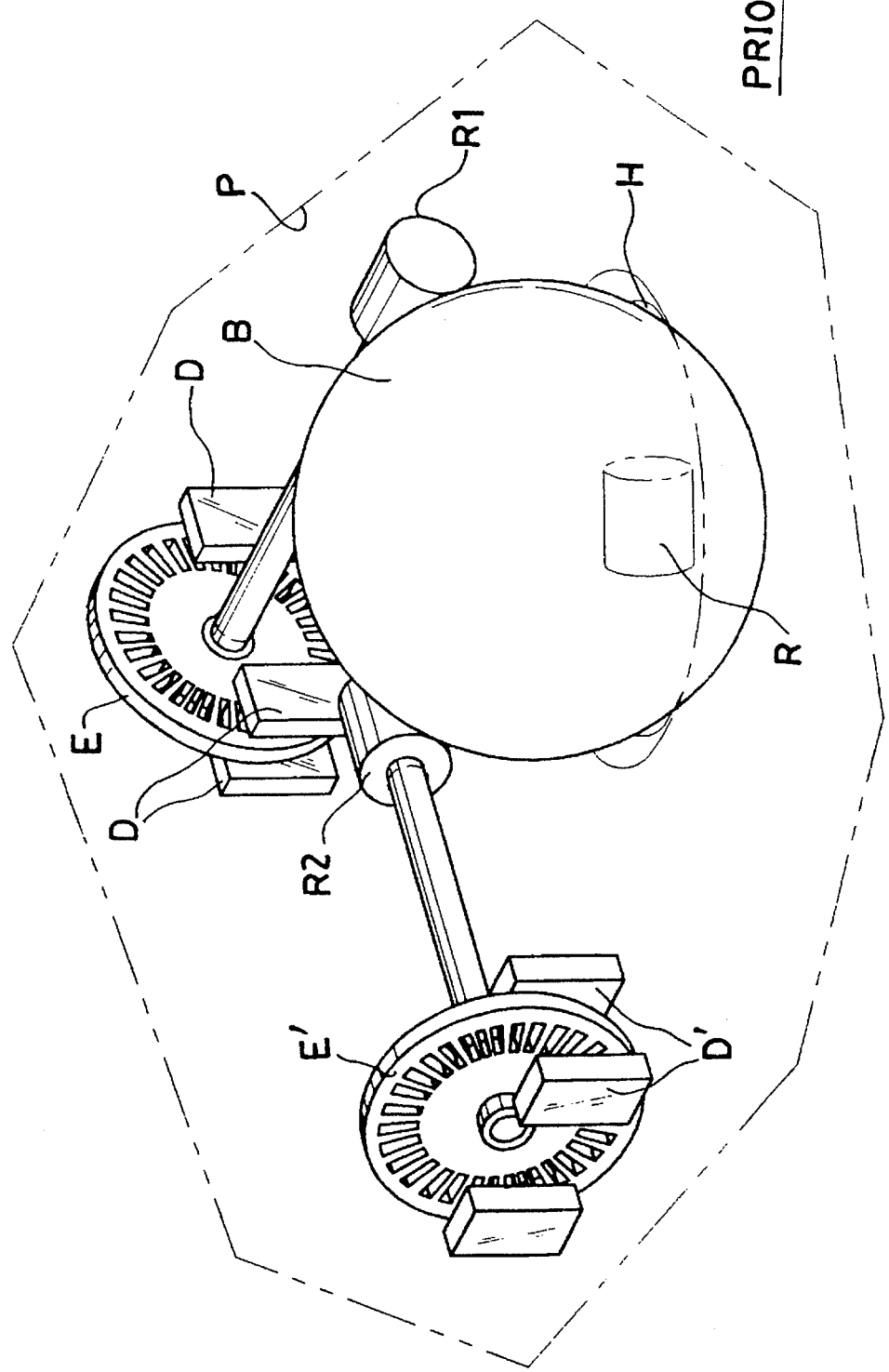
FIG. 1 is a perspective illustration showing a conventional mouse.
Figure 2:
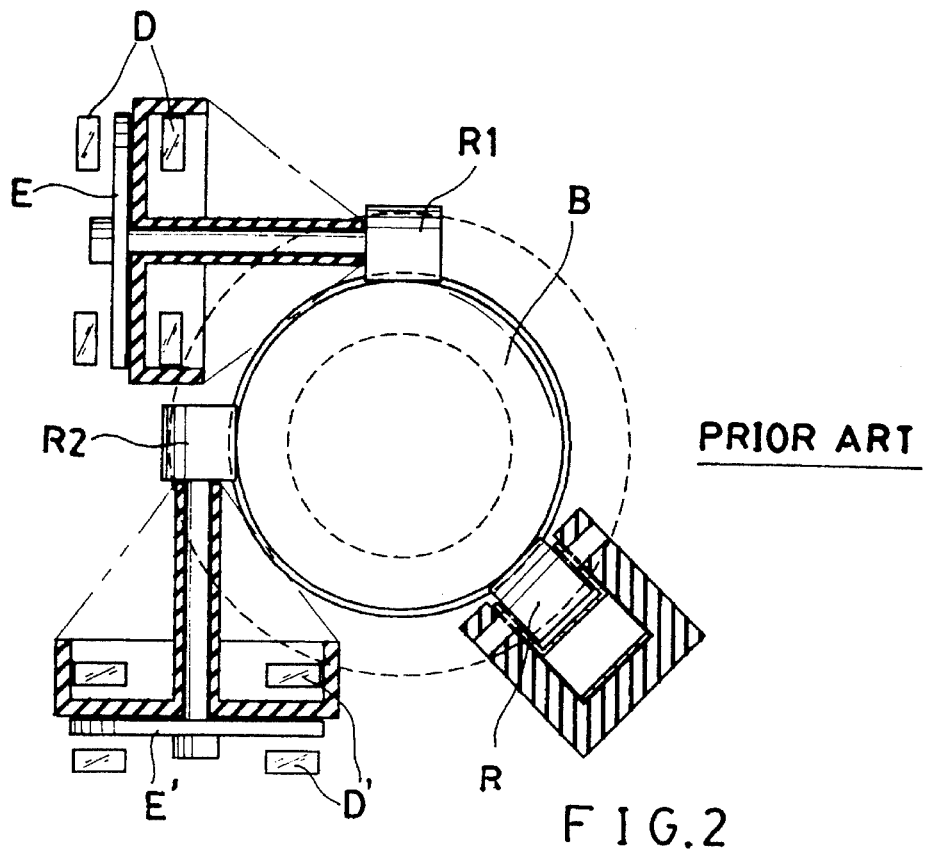
FIG. 2 is a top view of the conventional mouse.

As shown in FIGS. 3–6, the present invention comprises: a housing 1, an electronic circuit board 2 having an electronic circuit mounted in the housing 1, a X-axis driving gear system 3 and a Y-axis driving gear system.3a orienting perpendicularly with each other in the housing 1, a driving plate 4 for driving the two driving gear systems 3, 3a, a X-axis encoder 5 and a Y-axis encoder 5a mounted in the housing 1 to be actuated by the two driving gear systems 3, 3a.

The housing 1 includes: a base 11 for securing the electronic circuit board 2 on the base 1, an upper cover 12 combined with the base 11 for encasing the two driving gear systems 3, 3a and the two encoders 5, 5a in between the upper cover 12 and the base 11, a sliding jacket 14 generally rectangular shaped and defined in between an upper plate portion 141 and a lower plate portion 142 formed on an upper portion of the upper cover 12 for slidably holding the driving plate 4 in the sliding jacket 14, a top window 13 cut in the upper plate portion 141 of the upper cover 12 and communicating with the sliding jacket 14 for a sliding movement of an actuating portion 41 of the driving plate 4 along a XY coordinate, and a lower window 15 cut in the lower plate portion 142 for a movement of an upper portion of each driving gear system 3, 3a secured to a bottom 42 of the driving plate 4.

Figure 3:
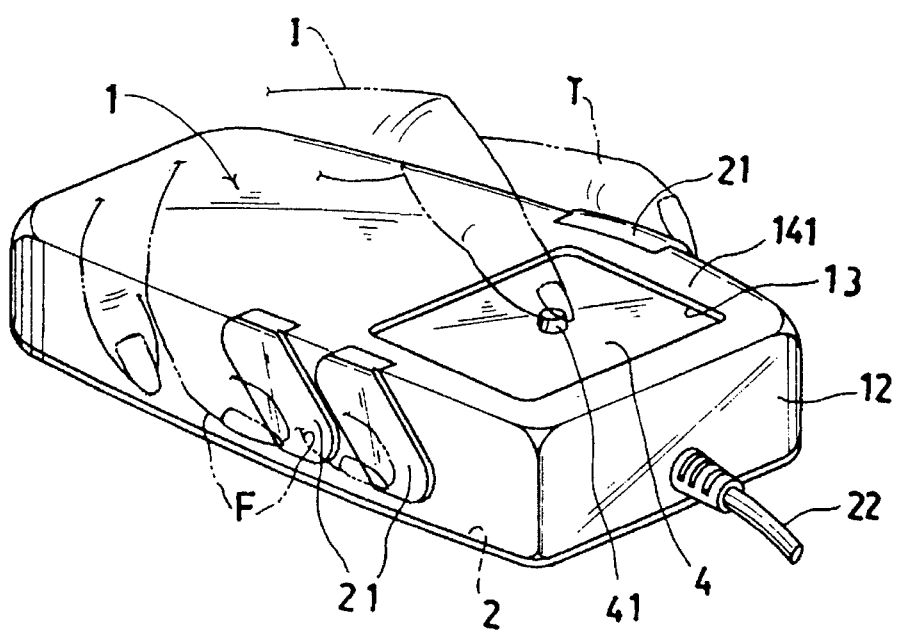
FIG. 3 is a perspective view of the present invention when assembled.
Figure 4:
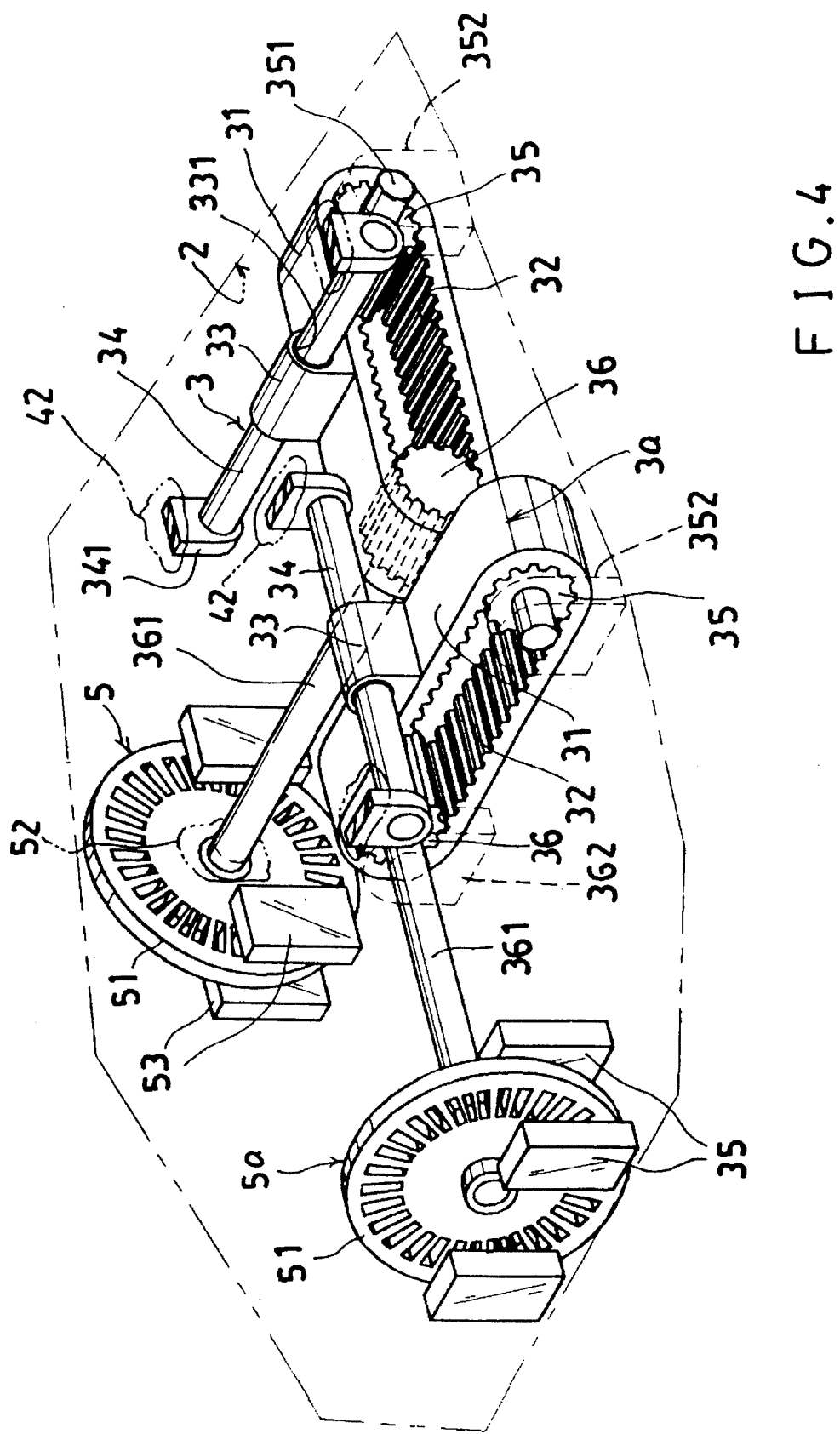
FIG. 4 is a perspective view showing an interior of the present invention.

The electronic circuit board 2 mounted on the base 11 includes: an electronic circuit (not shown) thereon for executing a plurality of functions preprogrammed in the electronic circuit, a plurality of buttons 21 formed on the upper cover 12 of the housing 1 adapted for a depression by a thumb T or a finger F such as a middle, a ring and or little finger as shown in FIG. 3 when holding the housing 1 of the present invention by a user's hand, with the user's index finger I moving the actuating portion 41 of the driving plate 4, and a cable 22 connected between the housing 1 and a computer (not shown) for transmitting the pulse waves as processed by the electronic circuit when sensed from the encoders 5, 5a.

The housing 1 may also be mounted or built in a keyboard of the computer, or may be free held by the user's hand (FIG. 3), not limited in this invention. The buttons 21 of the electronic circuit may also be modified to be located at suitable positions on the housing 1.

The X-axis driving gear system 3 includes: an endless toothed belt 31 having a plurality of belt teeth 32 continuously corrugatedly formed on an inside belt surface of the belt 31 and wound on a guiding gear 35 and a driving gear 36 disposed on two opposite end portions of the belt 31, a sliding hanger 33 formed at an upper central portion of the belt 31 and having a sliding hole 331 formed through the hanger 33, and a trolley rod 34 slidably engageable with the sliding hole 331 in the hanger 33 and having two fixing brackets 341 formed on two opposite ends of the trolley rod 34 and secured to a bottom 42 of the driving plate 4, with the sliding hole 331 and the trolley rod 34 parallel to a Y-axis of the XY coordinate to be tracked by the driving plate 4, the guiding gear 35 having a first gear shaft 351 parallel to the Y axis and rotatably mounted in at least a first gear bracket 352 secured on the electronic circuit board 2 on the base 11, and the driving gear 36 having a second gear shaft 361 parallel to the Y axis and rotatably mounted in a second gear bracket 362 secured on the electronic circuit board 2, with the second gear shaft 361 secured to the X-axis encoder 5 for detecting and encoding a movement pulse signal when moving the driving plate 4 and running the endless toothed belt 31 along a X axis of the XY coordinate.

The X-axis encoder 5 includes: an encoder disk 51 rotatably mounted in an encoder bracket 42 secured on the circuit board 2 on the base 11 and having a center of the disk 51 axially secured to an output end of the second gear shaft 361 of the driving gear 36 of the X-axis driving gear system 3, and a detector 53 for detecting the pulse signal from the encoder 5; while the Y-axis encoder 5a having structure and mechanism similar to that of the X-axis encoder 5, but with the encoder disk 51 of the Y-axis encoder 5a axially secured to a gear shaft 361 of the Y-axis driving gear system 3a which will be described in detail hereinafter.

The Y-axis driving gear system 3a includes: another endless toothed belt 31 having a plurality of belt teeth 32 continuously corrugatedly formed on an inside belt surface of the belt 31 and wound on another guiding gear 35 and another driving gear 36 disposed on two opposite end portions of the belt 31, another sliding hanger 33 formed at an upper central portion of the belt 31 and having a sliding hole 331 formed through the hanger 33, and another trolley rod 34 slidably engageable with the sliding hole 331 in the hanger 33 and having two fixing brackets 341 formed on two opposite ends of the trolley rod 34 and secured to a bottom 42 of the driving plate 4, with the sliding hole 331 and the trolley rod 34 of the Y-axis gear system 3a parallel to a X axis of the XY coordinate to be tracked by the driving plate the guiding gear 35 of the Y-axis gear system 3a having a first gear shaft 351 parallel to the X axis and rotatably mounted in at least a first gear bracket 352 secured on the electronic circuit board 2 on the base 11, and the driving gear 36 of the Y-axis system 3a having a second gear shaft 361 parallel to the X axis and rotatably mounted in a second gear bracket 362 secured on the electronic circuit board 2, with the second gear shaft 361 secured to the Y-axis encoder 5 for detecting and encoding a movement pulse signal when moving the driving plate 4 and running the endless toothed belt 31 along a Y axis of the XY coordinate.

The movement pulse signals as sensed by the detectors 53 of the two encoders 5, 5a will be processed by the electronic circuit on the circuit board 2 for transmitting pulse waves through the cable 22 to the computer to be read and decoded to move a cursor on a CRT (cathode-ray-tube) screen (not shown) corresponding to the movement of the driving plate 4 for pointing and drawing purposes.

The driving plate 4 generally rectangular shaped has the actuating portion 41 protruding upwardly from a central portion of the driving plate 4 to be free moved within the top window 13 cut in the upper cover 12 of the housing to be pressed by a user's index finger 1 for a coordinative movement of the driving plate 4 and the X-axis or Y-axis driving gear system 3, 3a secured to the bottom 42 of the driving plate.

The actuating portion 41 of the driving plate 4 may be formed with a fastener (not shown) to be fastened to a user's hand for stably manipulating the driving plate 4 of the point-and-draw device. The actuating portion 41 may be simplified to form a friction surface on the plate 4 for frictionally thrusting the plate 4.

During a X-axis movement of the driving plate 4 to run the belt 31 to rotate the gear 36 such as Sx marked on FIG. 6, the encoder disk of X-axis encoder 5 will be rotated for sensing the pulse signal of the movement, while the hanger 33 of the Y-axis driving gear system 3a will be slid along the trolley rod 34 of the Y-axis system 3a without retarding the movement on X-axis direction.

Meanwhile, a Y-axis movement of the driving plate 4 ("Sy" in FIG. 5) of the Y-axis gear system 3a will run the belt 31 for rotating the gear 36 for driving the encoder disk 51 of the Y-axis encoder 5a, but the trolley rod 34 of the X-axis driving gear system 3 will be free slid in the hanger 33 of the X-axis system 3 without being retarded.

Figure 7:
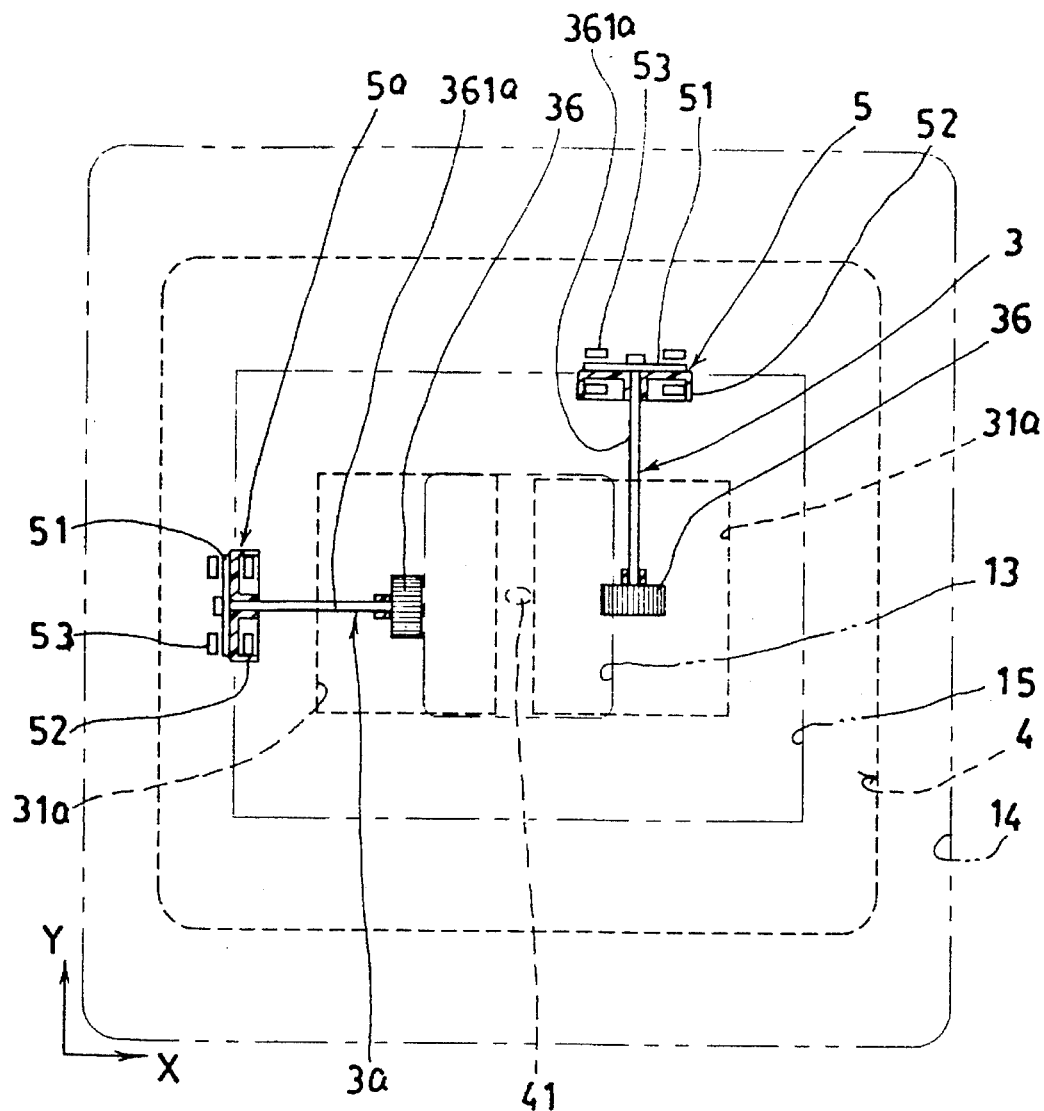
FIG. 7 is a top view illustration of another preferred embodiment of the present invention.
Figure 8:
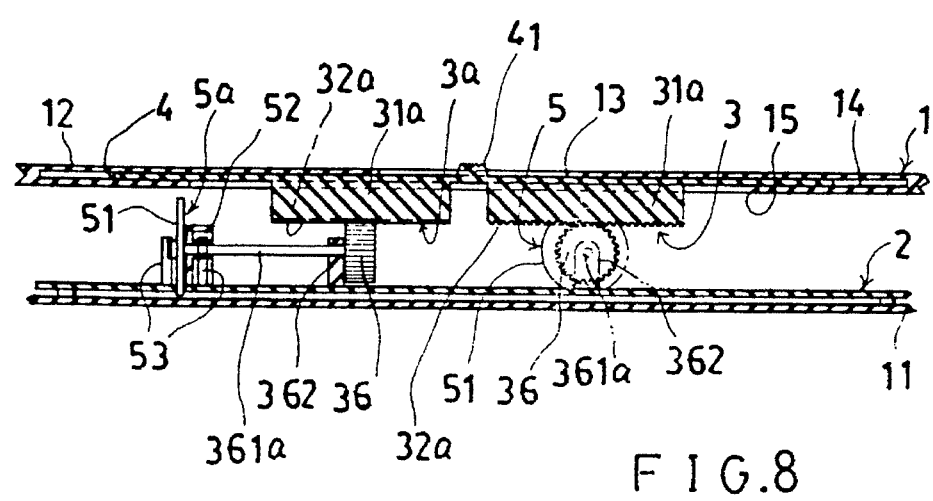
FIG. 8 is a sectional drawing of the present invention of FIG. 7.

As shown in FIGS. 7 and 8, each driving gear system 3, 3a may be modified to include: a disk rack 31a integrally secured to a bottom 42 of the driving plate 4 having a plurality of rack teeth 32a juxtapositionally transversely corrugated on the disk rack 31a and engageable with a driving gear 36 having a driving gear shaft 361a axially secured to an encoder disk 51 of the driving gear system 3, 3a. The rack teeth 32a transversely corrugated on the rack 31a of the X-axis driving gear system 3 are parallel to the Y axis, while the rack teeth 32a transversely corrugated on the rack 31a of the Y-axis driving gear system 3a are parallel to the X axis without obstructing the coordinative movements of the driving plate 4.

The present invention is superior to a conventional mouse with the following advantages:

1. There is no opening exposed to the environment to protrude the rotating or sliding elements outside the housing of this invention to prevent entrance of dusts and dirts into the interior of this invention for prolonging the service life of the device.

2. The driving plate 4 is moved within the windows 13, 15 without worrying about an "escape" from the device for helping concentration of an operator's mind in manipulating the computer and its peripherals for enhancing an operating efficiency.

3. The housing 1 may be free held by a user's hand, or may be placed at any location without occupying a big space. The housing 1 may be integrally formed with or built in a keyboard for forming a compact unit for its convenient operation.

4. The gear system provides a precise engagement between the belt and the gears or between the rack and the gears to ensure a reliable sensing operation to prevent an easy slipping or disengagement between the rollers R1, R2 and the ball B of the conventional mouse (FIG. 1).

The present invention may be modified without departing from the spirit and scope of this invention. For instance, the encoders and detectors may be otherwise modified for encoding the movement pulse signals when moving the driving plate 4.

I claim:

1. A point and draw device of a computer comprising:

a housing having an electronic circuit formed therein;

a driving plate slidably held on an upper portion of said housing and having an actuating portion formed on the driving plate for coordinatively manipulating said driving plate on said housing;

a X-axis driving gear system and a Y-axis driving gear system respectively mounted in said housing and orienting to be perpendicular with each other, each said driving gear system having an upper portion thereof secured to a bottom of said driving plate;

each said driving gear system connectable to an encoder for detecting a movement pulse signal during movement of the driving plate and each said driving gear system; whereby upon movement of said driving plate and each said driving gear system, a pulse signal will be encoded through the electronic circuit in said housing to a computer connected to said housing for decoding the pulse signal for moving a cursor on a cathode-ray-tube screen of the computer corresponding to the movement of the driving plate;

said housing including: a base for securing an electronic circuit board of the electronic circuit on the base, an upper cover combined with the base for encasing the two driving gear systems and said encoders in between the upper cover and the base, a sliding jacket generally rectangular shaped and defined in between an upper plate portion and a lower plate portion formed on an upper portion of the upper cover for slidably holding the driving plate in the sliding jacket, a top window cut in the upper plate portion of the upper cover and communicating with the sliding jacket for a sliding movement of the actuating portion of the driving plate along a XY coordinate, and a lower window cut in the lower plate portion for a movement of the upper portion of each said driving gear system secured to the bottom of the driving plate.

2. A point and draw device according to claim 1, wherein each said driving gear system includes: an endless toothed belt having a plurality of belt teeth continuously corrugatedly formed on an inside belt surface of the belt and wound on a guiding gear and a driving gear disposed on two opposite end portions of the belt, a sliding hanger formed at an upper central portion of the belt and having a sliding hole formed through the hanger, and a trolley rod slidably engageable with the sliding hole in the hanger and having two fixing brackets formed on two opposite ends of the trolley rod and secured to a bottom of the driving plate, with the sliding hole and the trolley rod parallel to one axis of the XY coordinate to be tracked by the driving plate, the guiding gear having a first gear shaft parallel to one axis of the XY coordinate and rotatably mounted in at least a first gear bracket secured on the electronic circuit board on the base, and the driving gear having a second gear shaft parallel to one axis of the XY coordinate and rotatably mounted in a second gear bracket secured on the electronic circuit board, with the second gear shaft secured to one said encoder for detecting and encoding a movement pulse signal when moving the driving plate and running the endless toothed belt along said axis of the XY coordinate.

3. A point and draw device according to claim 1, wherein each said driving gear system includes: a disk rack integrally secured to said bottom of the driving plate having a plurality of rack teeth juxtapositionally transversely corrugated on the disk rack and engageable with a driving gear having a driving gear shaft axially secured to one said encoder with respect to one said driving gear system.

4. A point and draw device according to claim 3, wherein said rack teeth transversely corrugated on a first rack of a X-axis driving gear system are parallel to a Y axis of the XY coordinate, and said second rack teeth transversely corrugated on a second rack of a Y-axis driving gear system are parellel to a X axis of the XY coordinate.

* * * * *